United States Patent
Zhao (10) Patent No.: US 12,170,047 B2
(45) Date of Patent: Dec. 17, 2024

(54) DISPLAY CONTROL METHOD, DISPLAY CONTROL DEVICE AND STORAGE MEDIUM

(71) Applicant: BEIJING XIAOMI MOBILE SOFTWARE CO., LTD., Beijing (CN)

(72) Inventor: Yun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 52 days.

(21) Appl. No.: 17/554,954

(22) Filed: Dec. 17, 2021

(65) Prior Publication Data

US 2022/0415236 A1    Dec. 29, 2022

(30) Foreign Application Priority Data

Jun. 24, 2021    (CN) .......................... 202110705884.0

(51) Int. Cl.
*G09G 3/20* (2006.01)

(52) U.S. Cl.
CPC ... *G09G 3/2003* (2013.01); *G09G 2320/0666* (2013.01); *G09G 2340/0407* (2013.01)

(58) Field of Classification Search
None
See application file for complete search history.

(56) References Cited

U.S. PATENT DOCUMENTS

2009/0243515 A1    10/2009    Kwisthout

FOREIGN PATENT DOCUMENTS

| CN | 106454554 A |   | 2/2017  |             |
|----|-------------|---|---------|-------------|
| CN | 107025087 A | * | 8/2017  | ........... G06F 3/1446 |
| CN | 109166159 A | * | 1/2019  | ................ G06T 7/90 |
| CN | 112118468 A | * | 12/2020 | ......... H04N 21/4122 |
| EP | 1994801 A1  |   | 11/2008 |             |
| WO | WO 2006003624 A1 | | 1/2006  |             |

OTHER PUBLICATIONS

Ben "Sorting and Colours", downloaded @ https://benmosheron.gitlab.io/blog/2019/01/24/sorting.html, posted online in 2019 (Year: 2019).*
Linggar A. Finding the Most Common Colors in Python, downloaded @ https://towardsdatascience.com/finding-most-common-colors-in-python-47ea0767a06a, posted online in 2020 (Year: 2020).*
European Patent Application No. 21217176.3, Search and Opinion dated May 31, 2022, 11 pages.
Indian Patent Application No. 202144061221, Office Action dated Feb. 1, 2023, 8 pages.
Chinese Patent Application No. 202110705884.0, Office Action dated Feb. 28, 2023, 6 pages.
Chinese Patent Application No. 202110705884.0, English translation of Office Action dated Jan. 20, 2023, 12 pages.

* cited by examiner

*Primary Examiner* — Yingchun He
(74) *Attorney, Agent, or Firm* — Cozen O'Connor (57) ABSTRACT

A display control method, for a terminal externally provided with a display assembly, includes: obtaining a target image including a current display frame of the terminal; determining a display region in the target image, in which the display region has a mapping relationship with a display unit included in the display assembly; determining color display data of the display region; and sending the color display data to the display assembly, to make the display unit corresponding to the display region display a color corresponding to the color display data.

16 Claims, 8 Drawing Sheets

DISPLAY CONTROL METHOD, DISPLAY CONTROL DEVICE AND STORAGE MEDIUM

CROSS-REFERENCE TO RELATED APPLICATION

This application is based upon and claims priority to Chinese Patent Application No. 202110705884.0, filed on Jun. 24, 2021, the entire content of which is incorporated herein by reference.

TECHNICAL FIELD

The disclosure relates to the field of terminals, and more particularly, to a display control method, a display control device and a storage medium.

BACKGROUND

Smart televisions (TVs) have become more and more popular in people's lives and their display performance has improved dramatically as display technologies progressed. However, users' requirements on smart TV functionality are also increasing. They may watch movies, play games or watch sports on the TVs at home. To pursue better viewing experience, they desire viewing experiences similar to that of a theater.

Most TVs are in a backlight display mode. That is, a screen display assembly of the TV may emit light while the rear shell of the TV may not emit light. To achieve individual viewing requirements, a user needs to specifically match a TV background wall to enhance visual effects and to alleviate visual fatigue. In addition to a large display screen of the theater, real-time lighting effects are also an indispensable factor for watching movies in the theater. For the TVs, the lighting effect rendering in a specific scene may not satisfy users' requirements.

SUMMARY

According to an aspect of embodiments of the disclosure, there is provided a display control method, for a terminal externally provided with a display assembly, including: obtaining a target image including a current display frame of the terminal; determining a display region in the target image, the display region having a mapping relationship with a display unit included in the display assembly; determining color display data of the display region; and sending the color display data to the display assembly, to make the display unit corresponding to the display region display a color corresponding to the color display data.

According to another aspect of embodiments of the disclosure, there is provided a display control method, for a display assembly externally provided on a terminal, including: receiving color display data from the terminal, the color display data being determined by the terminal based on a display region, the display region being a region having a mapping relationship with a display unit including in the display assembly in a target image including a current display frame of the terminal; and performing color display based on the color display data.

According to another aspect of embodiments of the disclosure, there is provided a display control device, including: a processor; and a memory for storing instructions executable by the processor; in which the processor is configured to perform any display control as described above.

According to another aspect of embodiments of the disclosure, there is provided a non-transitory computer-readable storage medium having stored therein instructions that, when executed by a processor of a mobile terminal, causes the mobile terminal to perform any display control method.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

People's requirements on display terminals are getting higher and higher and the terminal configuration is also getting higher and higher as display technologies progressed. In addition to requirements on the definition and resolution of the frame quality, higher requirements on the realization of the personalized display effect of the light that matches with the terminal to display, need to be provided.

Therefore, the disclosure provides a display control method, which reduces additional hardware costs, so that the display color of the display assembly may vary with the color of the frame displayed in the terminal and display colors of different display units corresponding to different display regions at the same time may be different. Therefore, rich display effects that change in real time as the display screen changes, may be realized.

Figure 1:
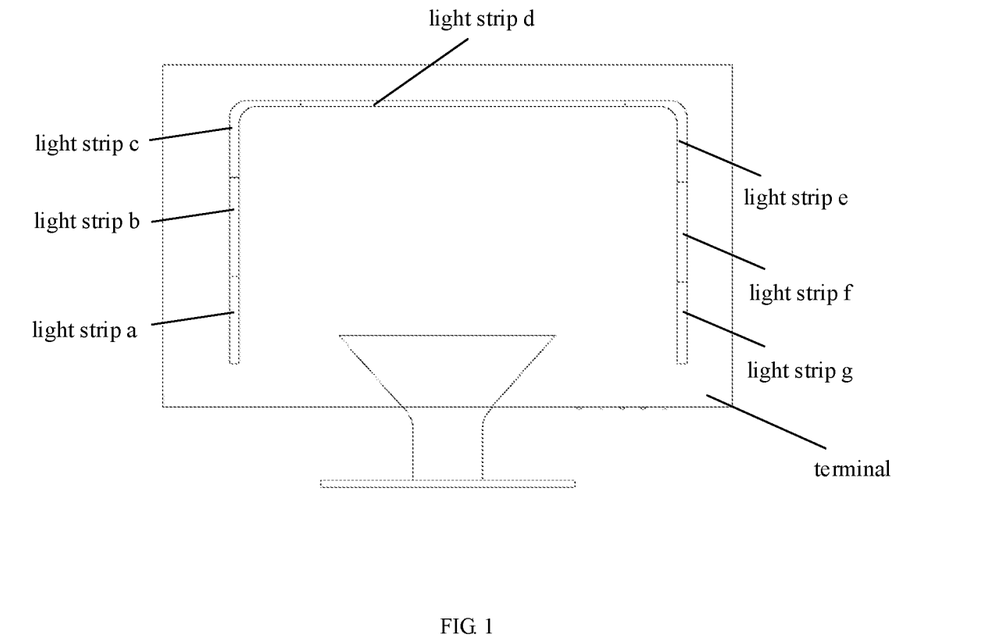
FIG. 1 is a schematic diagram illustrating a display assembly and a terminal, according to some embodiments of the disclosure.

FIG. 1 is a schematic diagram illustrating a display assembly and a terminal, according to some embodiments of the disclosure. The display assembly may be light strips, lamp beads or other forms of light-emitting assembly. It is understandable that the display assembly may include multiple display units. The display assembly may be set independently from the terminal or may be set as an accessory of the terminal to be used in conjunction with the terminal. As illustrated in FIG. 1, the terminal is a television (TV) and the display assembly is light strips as an example for description. An external display assembly (light strips) is placed on a rear of the TV display screen and the display assembly is arranged along edges of the TV display screen. The multiple display units of the display assembly, namely the light strip a, the light strip b, the light strip c, . . . , the light strip g, may be arranged continuously or discontinuously. When the TV is displaying images, for example, browsing pictures or playing videos, colors of different regions in the display screen may be different. The light strips and the display regions have a mapping relationship, that is, the effect of displaying different colors at the same time may be realized through the multiple light strips.

Figure 2:
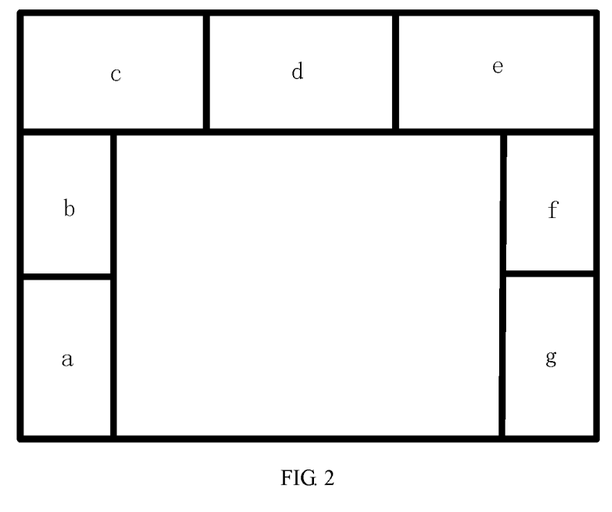
FIG. 2 is a schematic diagram illustrating a mapping relationship between a display assembly and display regions, according to some embodiments of the disclosure.

FIG. 2 is a schematic diagram illustrating a mapping relationship between a display assembly and display regions, according to some embodiments of the disclosure. Referring to FIG. 1 and FIG. 2, the light strip a, the light strip b, the light strip c, . . . , the light strip g, respectively may be mapped to the region a, the region b, the region c, . . . , the region g on the TV screen. When the terminal displays the current display frame, it takes a screenshot based on the current display frame to obtain the screenshot image, that is, the target image. Understandably, the region a, the region b, the region c, . . . , the region g in the TV screen respectively correspond to the display region a, the display region b, the display region c, . . . , the display region g in the target image. That is, the light strip a, the light strip b, the light strip a, . . . , the light strip g respectively correspond to the display region a, the display region b, the display region c, . . . , the display region g in the target image. The color of the display region a may be displayed through the light strip a. Therefore, different colors of different display regions may be displayed through different light strips.

Figure 3:
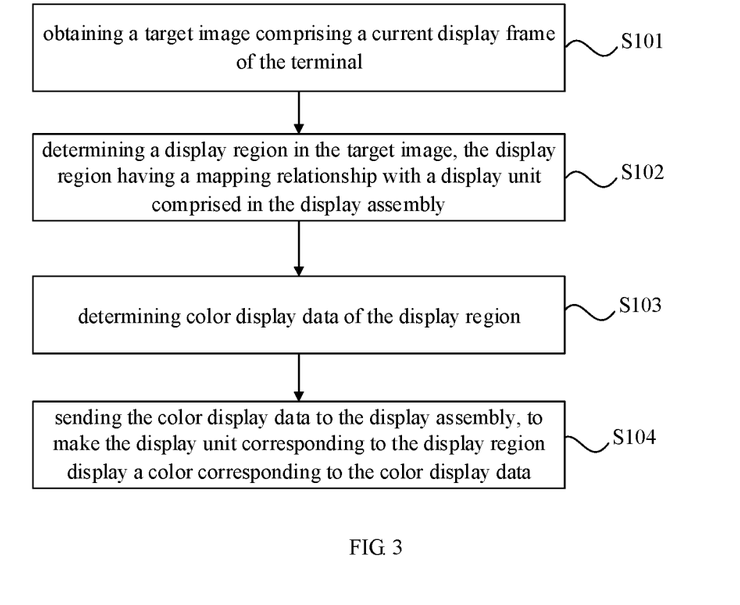
FIG. 3 is a flow chart showing a display control method, according to some embodiments of the disclosure.

FIG. 3 is a flow chart showing a display control method, according to some embodiments of the disclosure. The method is applicable to a terminal. The terminal may be a TV, a computer, a tablet and the like, which has the display function. A display assembly is externally mounted on the terminal. As illustrated in FIG. 3, the method includes the following.

In S101, a target image including a current display frame of the terminal, is obtained.

In S102, a display region in the target image is determined. The display region has a mapping relationship with a display unit included in the display assembly.

In S103, color display data of the display region are determined.

In S104, the color display data are sent to the display assembly, to make the display unit corresponding to the display region display a color corresponding to the color display data.

In some embodiments of the disclosure, the display assembly is mounted externally on the terminal. The display assembly includes one or more display units. When the terminal displays images, for example, browses pictures or plays videos, the display frame of the terminal may change in real time and the target image of the current display frame of the terminal is obtained. That is, the obtained target image has the corresponding relationship with the current display frame of the terminal. The display region has the mapping relationship with the display unit of the display assembly, that is, the color of the display region is displayed by the display unit which has the mapping relationship with this display region. In the target image of the current display frame of the terminal, the display region corresponding to the display unit is determined and the color display data of the display region are determined. The terminal sends the color display data to the display assembly, so that the display unit displays based on the color display data corresponding to the corresponding display region, that is, the display assembly displays the color corresponding to the corresponding display region.

In some embodiments of the disclosure, a communication between the terminal and the display assembly may be established, for example, via Bluetooth communication or a local area network, to realize the transmission of the color display data from the terminal to the display assembly.

According to some embodiments of the disclosure, the display assembly is mounted externally on the display terminal. When frames are displayed, the terminal obtains the target image, determines the display region in the target image which has the mapping relationship with the display unit included in the display assembly, determines the color display data of the display region and sends the determined color display data to the display assembly, so that the display color of the display unit may vary with the color of the frame displayed in the terminal. The display color of the terminal screen is extended, the display effect of changing by different colors of the display assembly may be realized and the user experience may be improved.

Figure 4:
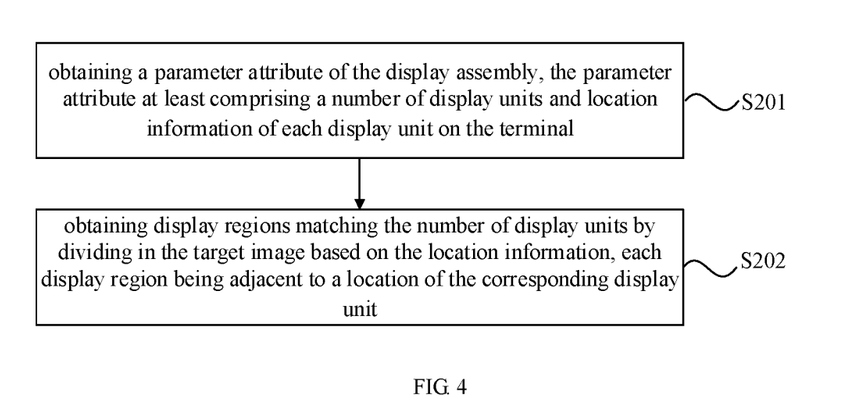
FIG. 4 is a flow chart showing a method for determining a display region, according to some embodiments of the disclosure.

FIG. 4 is a flow chart showing a method for determining a display region, according to some embodiments of the disclosure. As illustrated in FIG. 4, the method includes the following.

In S201, a parameter attribute of the display assembly is obtained. The parameter attribute at least includes a number of display units and location information of each display unit on the terminal.

In S202, display regions matching the number of display units are obtained by dividing in the target image based on the location information. Each display region is adjacent to a location of the corresponding display unit.

In some embodiments of the disclosure, the display assembly is mounted externally on the terminal. The display assembly includes one or more display units. When the terminal displays images, the display unit displays the color of the display region that has the mapping relationship with this display unit. The display region corresponding to the display unit is determined in the target image of the current display frame on the terminal. The color display data of the display region are determined for the display assembly to display based on the color display data. When determining the display region corresponding to the display unit, it may be determined by the parameter attribute of the display assembly. The parameter attribute of the display unit may be set by the user. For example, the user realizes the parameter setting through an interactive interface that displays the parameter attribute setting of the display assembly in the application of the display assembly. The parameter attribute of the display assembly may include information about the number of display units and the location information of each display unit on the terminal. Based on the obtained location information of the display units, multiple display regions are divided in the target image. The number of the multiple display regions matches the number of display units and the display region is a region adjacent to the location of the display unit. For example, the number of display units (light strips) of the terminal in FIG. 1 is 8. Correspondingly, the target image is divided into 8 display regions. Therefore, the light strips and the display regions correspond one-to-one. The light strip a placed in the upper left of the terminal corresponds to the display region a adjacent to the location of the light strip a, the light strip c placed in the upper right of the terminal corresponds to the display region c adjacent to the location of the light strip c, and the like.

According to some embodiments of the disclosure, the display assembly is mounted externally on the display terminal. When frames are displayed, the terminal obtains the target image. The display regions matching the number of display units of the display assembly may be divided in the target image. Each display region is the region adjacent to the location of the display unit. The color display data of the display region is determined and the determined color display data is sent to the display assembly. The color displayed by the display unit is determined based on the color of the adjacent display region. Therefore, the display assembly may be used as the extension of the display color of the terminal screen, which brings a stronger sense of presence and immersion in the user's viewing.

Figure 5:
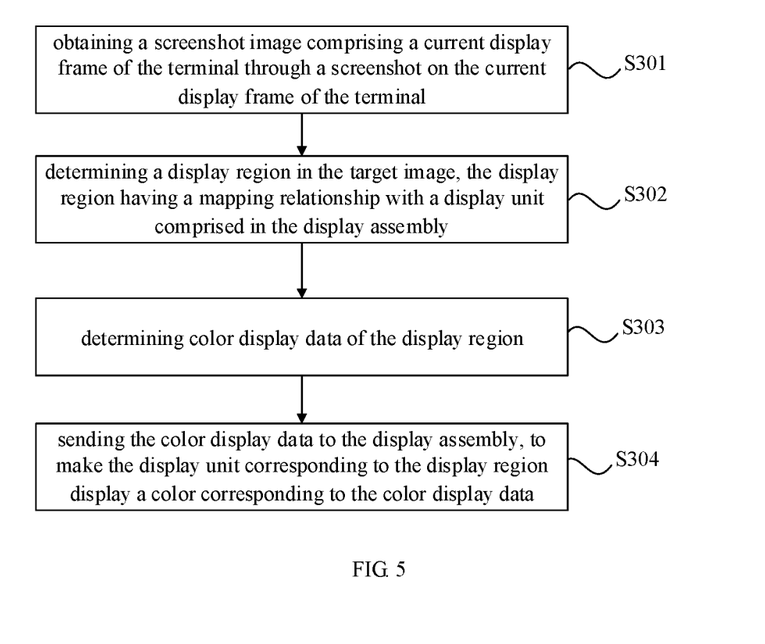
FIG. 5 is a flow chart showing another display control method, according to some embodiments of the disclosure.

FIG. 5 is a flow chart showing another display control method, according to some embodiments of the disclosure. As illustrated in FIG. 5, the method includes the following.

In S301, a screenshot image including a current display frame of the terminal is obtained as a target image through a screenshot on the current display frame of the terminal.

In S302, a display region in the target image is determined. The display region has a mapping relationship with a display unit included in the display assembly.

In S303, color display data of the display region are determined.

In S304, the color display data are sent to the display assembly, to make the display unit corresponding to the display region display a color corresponding to the color display data.

In some embodiments of the disclosure, the display assembly is mounted externally on the terminal. When the terminal displays images, the target image of the current display frame of the terminal is obtained. That is, the obtained target image has the corresponding relationship with the current display frame of the terminal. The display region has the mapping relationship with the display unit of the display assembly, that is, the color of the display region is displayed by the display unit which has the mapping relationship with this display region. Therefore, the display unit which has the mapping relationship with the display region displays the color of the display region.

In some embodiments of the disclosure, the target image of the current display frame of the terminal may be obtained through the screenshot of the current display frame of the terminal, to obtain the screenshot image including the current display frame of the terminal as the target image.

According to some embodiments of the disclosure, the display assembly is mounted externally on the display terminal. When frames are displayed, the screenshot of the current display frame of the terminal is obtained to obtain the screenshot image including the current display frame of the terminal as the target image. The display region that has the mapping relationship with the display unit may be determined in the target image. The color display data of the display region are determined and sent to the display assembly, so that the display color of the display unit may be changed in real time with the target image obtained in real time. The color change of the color display of the display assembly is realized and the display effect of the terminal is improved.

Figure 6:
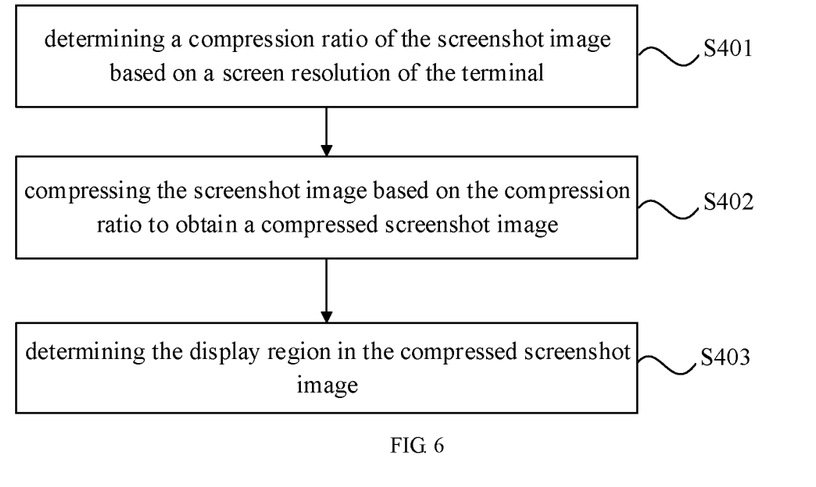
FIG. 6 is a flow chart showing another method for determining a display region, according to some embodiments of the disclosure.

FIG. 6 is a flow chart showing another method for determining a display region, according to some embodiments of the disclosure. As illustrated in FIG. 6, the method includes the following.

In S401, a compression ratio of the screenshot image is determined based on a screen resolution of the terminal.

In S402, the screenshot image is compressed based on the compression ratio to obtain a compressed screenshot image.

In S403, the display region is determined in the compressed screenshot image.

In some embodiments of the disclosure, when determining the display region corresponding to the display unit included in the display assembly, in the target image of the current display frame, it may be determined based on the parameter attribute of the display assembly. For example, the parameter setting may be performed in an application for controlling the display assembly and the location information of the display unit in the display region of the terminal screen is determined based on the parameter attribute of the display assembly, for example, the location of the display region (corresponding to the display unit) relative to the terminal screen, the shape of the display region, the size of the display region, the proportional relationship between the size of the display region and the screen size and the like. According to the location information of the display region corresponding to the display unit and the screen size, coordinates of the boundary points of the display region relative to the target image of the current display frame of the terminal may be obtained, so as to determine the display region corresponding to the display unit in the target image. When indicating the coordinates of the boundary points of the display region corresponding to the display unit, the boundary points of the target image may be used as the origin of the coordinate system.

Figure 7:
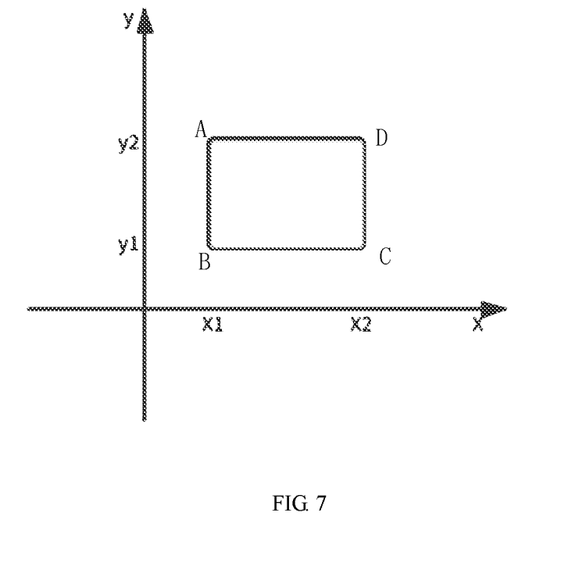
FIG. 7 is a schematic diagram illustrating coordinates of a display region corresponding to a display assembly, according to some embodiments of the present disclosure.

FIG. 7 is a schematic diagram illustrating coordinates of a display region corresponding to a display assembly, according to some embodiments of the present disclosure. Referring to FIG. 7, the display region corresponding to the display unit is a rectangular region. Four vertices of the region are A, B, C and D, respectively corresponding to the upper left corner, lower left corner, lower right corner and upper right corner of the display region. Coordinates of A, B, C and D are (x1, y2), (x1, y1), (x2, y2) and (x2, y1). The terminal determines the display region in the screenshot image of the screen currently displayed on the terminal based on coordinates of ABCD, that is, determines the display region of the corresponding display unit. The coordinates corresponding to the display unit may be stored and transmitted in the form of an array. For example, the array new int[ ]{x1, x2, y1, y2} represents the vertex coordinates of the display region ABCD. In order to save storage space and increase the processing speed, the screenshot image with the higher resolution may be compressed to reduce the space occupation of the screenshot image. The compression ratio of the screenshot image may be determined based on the screen resolution of the terminal and the screenshot image may be compressed based on the compression ratio to obtain the compressed screenshot image. Understandably, a larger compression ratio may be used for screenshot images with the larger screen resolution. Corresponding to screenshot images with the small screen resolution, a smaller compression ratio may be used. For example, for an image with a resolution of 3840×2160, the compression ratio may be set to 8. For an image with a resolution of 1920×1080, the compression ratio may be set to 4. The display region may be determined in the compressed screenshot image.

In some embodiments of the disclosure, the target image of the current display frame of the terminal is obtained. The screenshot is performed on the current display frame of the terminal, the compression ratio of the screenshot image is determined based on the screen resolution of the terminal and the screenshot image is compressed based on the compression ratio to obtain the compressed screenshot image, to improve the speed at which the terminal determines the display color of the display assembly and reduce the space occupied by the screenshot image.

Figure 8:
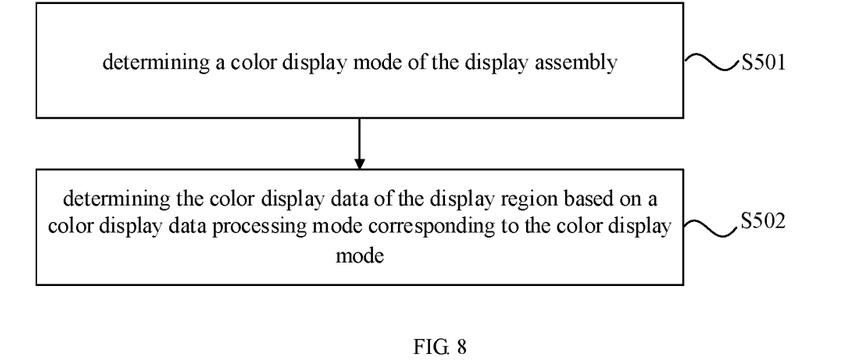
FIG. 8 is a flow chart showing a method for determining color display data of a display region, according to some embodiments of the present disclosure.

FIG. 8 is a flow chart showing a method for determining color display data of a display region, according to some embodiments of the present disclosure. As illustrated in FIG. 8, the method for determining color display data of the display region may include the following.

In S501, a color display mode of the display assembly is determined.

In S502, the color display data of the display region is determined based on a color display data processing mode corresponding to the color display mode.

In some embodiment of the disclosure, when the terminal displays images, the target image of the current display frame of the terminal is obtained, that is, the obtained target image has the corresponding relationship with the current display frame of the terminal. The display region has the mapping relationship with the display unit included in the external display assembly of the terminal, that is, the color of the display region is displayed by the display unit that has the mapping relationship with this display region. Therefore, the display unit corresponding to the display region corresponds to display the color of the display region. It may be determined by the user in an application that controls the display assembly through interactive settings to determine the color display mode of the display assembly. The color display modes of the display assembly have the mapping relationship with the color display data processing modes. The color display data processing mode corresponding to the color display mode may be determined based on the color display mode of the display assembly. When determining the color display data in the display region corresponding to the display unit, the color display data in the display region may be determined based on the color display data processing mode. For example, the color display data processing mode may be a processing mode in which the color with the highest saturation in the display region is used as the color of the display region. In this processing mode, the color display data processing mode in the display region is to obtain the most saturated color in the display region, that is, the color is the most colorful and brightest in the visual effect presented in the display region. The color displayed by the display unit corresponding to the display region is the most eye-catching color in the display region. For example, the color value of each pixel in the display region corresponding to the display unit may be obtained. The coordinate information and color values of all pixels in the display region may be stored in the color value array corresponding to the display region. The color of the first pixel in the color value array may be obtained as the color with the current highest saturation. A method similar to the bubble sorting may be used to obtain the color value of the second pixel in the color value array and compare it with the color value with the current highest saturation. If the saturation determined based on the color value of the second pixel is greater than the current saturation, the color of the second pixel is replaced as the color with the highest saturation. The above actions may be repeated to traverse all the color values in the color value array corresponding to the display region to obtain the color value with the highest saturation in the display region corresponding to the display unit. That is, the color display data in the display region may be determined based on the color display data processing mode. The display unit corresponding to the display region is controlled to perform color display on the determined color display data.

In some embodiments of the disclosure, the color display data processing mode may also be a processing mode in which the color with the largest range in the display region is used as the color of the display region. In this processing mode, the color display data processing mode in the display region is to obtain the color that occupies the largest range in the display region. It may be understood as that this color is the main color in the visual effect presented in the display region. The display color of the display unit corresponding to the display region is the main color of the display region. The color value of each pixel in the display region corresponding to the display unit may be obtained. The coordinate information and color values of all pixels in the display region may be stored in the color value array corresponding to the display region. The color value array may be traversed to store the coordinate information of the pixels with the same color value into the secondary array under the color value array. There may be multiple secondary arrays, each of which includes pixels with the same color value. The number of array elements included in each of the multiple secondary arrays may be determined, in which the color value corresponding to the secondary array with the largest number of array elements may be used as the color display data in the display region determined by the color display data processing mode. The display unit corresponding to the display region may be controlled to display the determined color display data for color display.

According to some embodiments of the disclosure, when displaying frames, the terminal obtains the target image. The screen display effect may be improved through the external display assembly. The display assembly may include different color display modes. The color display data of the display region corresponding to the display unit included in the display assembly may be processed differently to obtain the color display data used to control the display unit to display, realizing the display effect of different color display modes of different display units and satisfying the personalized use requirements of the user.

Figure 9:
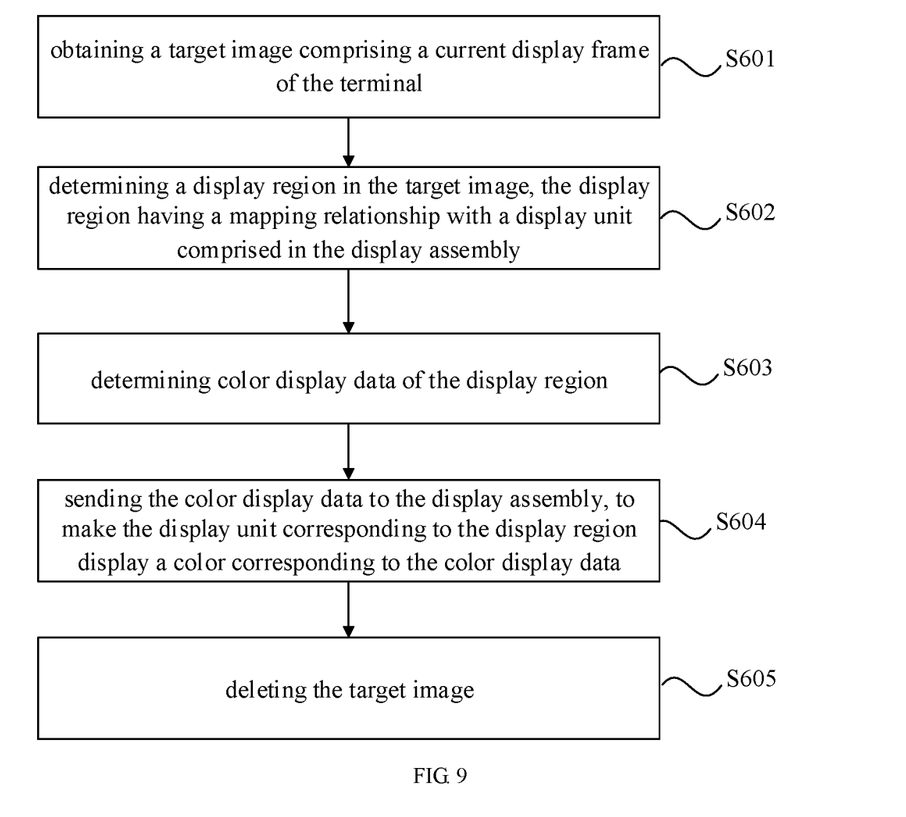
FIG. 9 is a flow chart showing still another display control method, according to some embodiments of the disclosure.

FIG. 9 is a flow chart showing still another display control method, according to some embodiments of the disclosure. As illustrated in FIG. 9, the method includes the following.

In S601, a target image including a current display frame of the terminal, is obtained.

In S602, a display region in the target image is determined. The display region has a mapping relationship with a display unit included in the display assembly.

In S603, color display data of the display region are determined.

In S604, the color display data are sent to the display assembly, to make the display unit corresponding to the display region display a color corresponding to the color display data.

In S605, the target image is deleted.

In some embodiments of the disclosure, when the terminal displays images, the screenshot of the current display frame of the terminal is taken and the screenshot image including the current display frame of the terminal is obtained as the target image. That is, the obtained target image has the corresponding relationship with the current display frame of the terminal. The display region has the mapping relationship with the display unit included in the display assembly. That is, the color display of the display region may be displayed by the display unit having the mapping relationship with this display region. Therefore, the color corresponding to the display region is displayed by the display unit corresponding to this display region. The terminal sends the color display data to the display assembly, so that the display unit included in the display assembly performs display based on the color display data corresponding to the corresponding display region. After determining the color display data of the display assembly, the terminal deletes the screenshot image obtained from the screenshot of the display screen to avoid occupying the terminal memory and save resources. After the terminal determines the color display data of the display assembly and before the terminal sends the color display data to the display assembly, the screenshot image is deleted to further reduce the memory usage of the terminal.

According to some embodiments of the disclosure, the display assembly is mounted externally on the terminal. When frames are displayed, the screenshot of the current display frame of the terminal is obtained to obtain the screenshot image including the current display frame of the terminal as the target image. The display region that has the mapping relationship with the display unit may be determined in the target image. The color display data of the display region may be determined and sent to the display assembly. The display assembly is controlled to display based on the determined color display data. After determining the color display data of the display assembly, the screenshot image of the display screen is deleted to reduce the occupation of the storage space of the terminal.

In some embodiments of the disclosure, the terminal may determine the display color based on a preset time threshold, so that the display color of the display assembly may change as the color of the real-time display screen of the terminal changes and the display effect is further improved.

Figure 10:
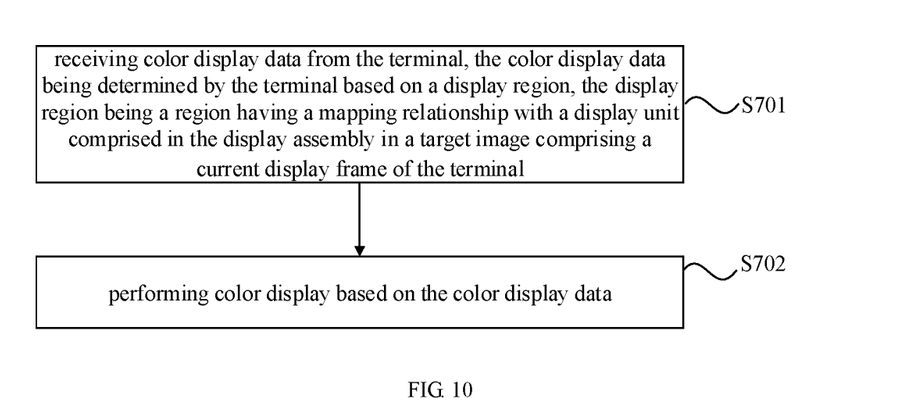
FIG. 10 is a flow chart showing yet still another display control method, according to some embodiments of the disclosure.

FIG. 10 is a flow chart showing yet still another display control method, according to some embodiments of the disclosure. The method is applicable to a display assembly externally provided on a terminal. As illustrated in FIG. 10, the method includes the following.

In S701, color display data are received from the terminal. The color display data are determined by the terminal based on a display region. The display region is a region having a mapping relationship with a display unit included in the display assembly in a target image including a current display frame of the terminal, In S702, color display is performed based on the color display data.

In some embodiments of the disclosure, the display assembly is mounted externally on the terminal. The display assembly includes one or more display units. When the terminal displays frames, it is determined that the external display assembly is used for color display. The parameter information of the display assembly may be set in the application for controlling the display assembly. For example, the number of display units used for display and the location information of the display unit on the terminal may be determined. The terminal determines the target image based on the current display frame, determines the display region that has the mapping relationship with the display unit in the target image and determines the color display data of the display region.

The terminal establishes a communication with the display assembly, such as via Bluetooth communication or a local area network connection, to realize the transmission of the color display data from the terminal to the display assembly. The terminal sends the color display data of the display region that has the mapping relationship with the display unit to the display assembly. The display assembly receives the color display data sent by the terminal and performs color display based on the color display data.

According to some embodiments of the disclosure, the display assembly is mounted externally on the display terminal. When frames are displayed, the terminal obtains the target image, determines the display region in the target image which has the mapping relationship with the display unit included in the display assembly, determines the color display data of the display region and sends the determined color display data to the display assembly, so that the display color of the display unit may vary with the color of the frame displayed in the terminal. The display color of the terminal screen is extended, the display effect of changing by different colors of the display assembly may be realized and the user experience may be improved.

Based on the same concept, embodiments of the disclosure also provide a display control apparatus.

It may be understood that, to implement the above-mentioned functions, the apparatus provided in the embodiments of the disclosure includes hardware structures and/or software modules corresponding to various functions. In combination with the units and algorithm actions of the examples disclosed in the embodiments of the disclosure, the embodiments of the disclosure may be implemented in a form of hardware or a combination of hardware and software. Whether a certain function is executed by hardware or software-driven hardware depends on the specific application and design constraint conditions of the technical solutions. Those skilled in the art may use different methods for each specific application to implement the described functions, but such implementation should not be considered as going beyond the scope of the technical solutions of the embodiments of the disclosure.

Figure 11:
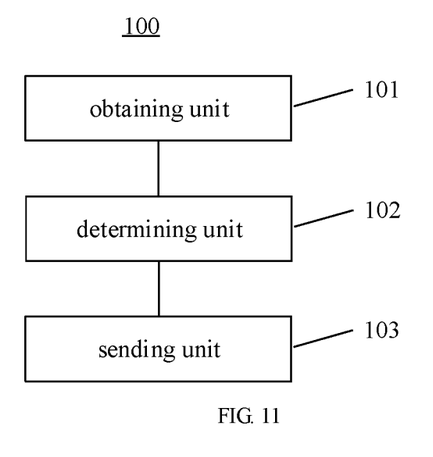
FIG. 11 is a block diagram of a display control apparatus, according to some embodiments of the disclosure.

FIG. 11 is a block diagram of a display control apparatus, according to some embodiments of the disclosure. The apparatus is applicable to a terminal. The terminal is externally provided with a display assembly. Referring to FIG. 11, the apparatus 100 includes an obtaining unit 101, a determining unit 102 and a sending unit 103.

The obtaining unit 101 is configured to obtain a target image including a current display frame of the terminal.

The determining unit 102 is configured to determine a display region in the target image, the display region having a mapping relationship with a display unit included in the display assembly, and determine color display data of the display region.

The sending unit 103 is configured to send the color display data to the display assembly, to make the display unit corresponding to the display region display a color corresponding to the color display data.

In some embodiments, the determining unit 102 is configured to determine the display region in the target image by actions of: obtaining a parameter attribute of the display assembly, the parameter attribute at least including a number of display units and location information of each display unit on the terminal; and obtaining display regions matching the number of display units by dividing in the target image based on the location information, each display region being adjacent to a location of the corresponding display unit.

In some embodiments, the obtaining unit 101 is configured to obtain the target image including the current display frame of the terminal by an action of: obtaining a screenshot image including the current display frame of the terminal through a screenshot on the current display frame of the terminal.

In some embodiments, the determining unit 102 is configured to determine the display region in the target image by actions of: determining a compression ratio of the screenshot image based on a screen resolution of the terminal; compressing the screenshot image based on the compression ratio to obtain a compressed screenshot image; and determining the display region in the compressed screenshot image.

In some embodiments, the determining unit 102 is configured to determine the color display data of the display region by actions of: determining a color display mode of the display assembly; and determining the color display data of the display region based on a color display data processing mode corresponding to the color display mode; in which the color display mode and the color display data processing mode have a mapping relationship and the color display data processing mode includes a color processing mode where a color with a highest saturation in the display region as a color of the display region; or a color processing mode where a color with a largest range in the display region as a color of the display region.

In some embodiments, the determining unit 102 is further configured to: delete the target image.

Figure 12:
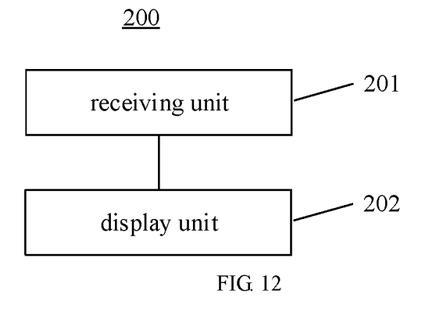
FIG. 12 is a block diagram of another display control apparatus, according to some embodiments of the disclosure.

FIG. 12 is a block diagram of another display control apparatus, according to some embodiments of the disclosure. The apparatus is applicable to a display assembly. A terminal is externally provided with the display assembly. Referring to FIG. 12, the apparatus 200 includes a receiving unit 201 and a display unit 202.

The receiving unit 201 is configured to receive color display data from the terminal, the color display data being determined by the terminal based on a display region, the display region being a region having a mapping relationship with a display unit included in the display assembly in a target image including a current display frame of the terminal.

The display unit 202 is configured to perform color display based on the color display data.

With respect to the apparatuses in the above embodiments, the specific manners for performing operations for individual modules therein have been described in detail in the embodiments regarding the methods, which will not be elaborated herein.

Figure 13:
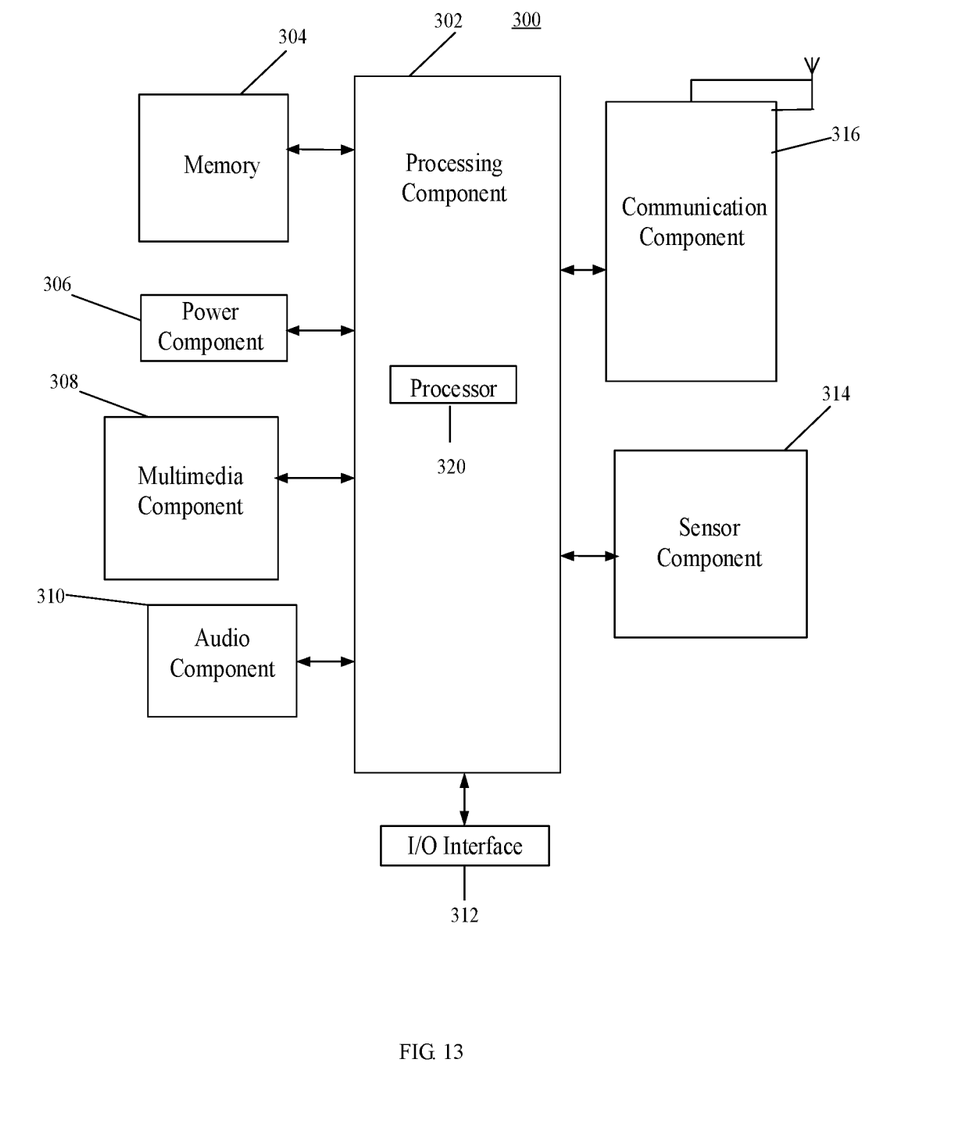
FIG. 13 is a block diagram of a display control device, according to some embodiments of the disclosure.

FIG. 13 is a block diagram of a display control device 300, according to some embodiments of the disclosure. For example, the device 300 may be a mobile phone, a computer, a digital broadcast terminal, a messaging device, a gaming console, a tablet, a medical device, exercise equipment, a personal digital assistant, and the like.

Referring to FIG. 13, the device 300 may include one or more of the following components: a processing component 302, a memory 304, a power component 306, a multimedia component 308, an audio component 810, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the actions in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2Q or 3Q or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship. As used in the disclosure and the appended claims, the singular forms "a," "an" and "the" are intended to include the plural forms as well, unless the context clearly indicates otherwise.

It shall be understood that, although the terms "first," "second," and the like may be used herein to describe various information, the information should not be limited by these terms. These terms are only used to distinguish one category of information from another. For example, without departing from the scope of the present disclosure, first information may be termed as second information; and similarly, second information may also be termed as first information.

It shall be further understood that, unless otherwise specified, "connected" includes a direct connection between the two without other components and also includes an indirect connection between the two with other elements.

It shall be further understood that, although the operations are described in a specific order in the drawings in some embodiments of the disclosure, they should not be understood as requiring these operations to be performed in the specific order shown or in a serial order or requiring to perform all the operations shown to obtain the desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A display control method, for a terminal externally provided with a display assembly, comprising:
   obtaining a target image comprising a current display frame of the terminal;
   determining a display region in the target image, wherein the display region has a mapping relationship with a display unit comprised in the display assembly, wherein coordinates of boundary points of the display region relative to the target image of the current display frame of the terminal is obtained according to location information of the display region corresponding to the display unit and a screen size, the coordinates being configured to determine the display region corresponding to the display unit, the coordinates being stored and transmitted in a form of an array, wherein the location information of the display region corresponding to the display unit comprises a location of the display region corresponding to the display unit relative to a terminal screen, a shape of the display region, a proportional relationship between a size of the display region and the screen size;
   determining color display data of the display region; and
   sending the color display data to the display assembly via a communication between the terminal and the display assembly established in advance, to make the display unit corresponding to the display region display a color corresponding to the color display data;

wherein determining the color display data of the display region comprises:

determining a color display mode of the display assembly; and determining the color display data of the display region based on a color display data processing mode corresponding to the color display mode;

wherein, the color display mode and the color display data processing mode have a mapping relationship and the color display data processing mode comprises a color processing mode where a color with a highest saturation in the display region as a color of the display region; or a color processing mode where a color with a largest range in the display region as a color of the display region.

2. The method as claimed in claim 1, wherein determining the display region in the target image comprises:

obtaining a parameter attribute of the display assembly, the parameter attribute at least comprising a number of display units and location information of each display unit on the terminal; and obtaining display regions matching the number of display units by dividing in the target image based on the location information, each display region being adjacent to a location of a corresponding display unit mapped to the determined display region in the target image.

3. The method as claimed in claim 1, wherein obtaining the target image comprising the current display frame of the terminal comprises:

obtaining a screenshot image comprising the current display frame of the terminal through a screenshot on the current display frame of the terminal.

4. The method as claimed in claim 3, wherein determining the display region in the target image comprises:

determining a compression ratio of the screenshot image based on a screen resolution of the terminal;

compressing the screenshot image based on the compression ratio to obtain a compressed screenshot image; and determining the display region in the compressed screenshot image.

5. The method as claimed in claim 1, after sending the color display data to the display assembly, further comprising:

deleting the target image.

6. The method as claimed in claim 1, for the display assembly externally provided on the terminal, comprising:

receiving the color display data from the terminal; and
performing color display based on the color display data.

7. A display control device, implemented in a terminal externally provided with a display assembly, the device comprising:

a processor; and
a memory for storing instructions executable by the processor;

wherein the processor is configured to:

obtain a target image comprising a current display frame of the terminal;

determine a display region in the target image, wherein the display region has a mapping relationship with a display unit comprised in the display assembly, wherein coordinates of boundary points of the display region relative to the target image of the current display frame of the terminal is obtained according to location information of the display region corresponding to the display unit and a screen size, the coordinates being configured to determine the display region corresponding to the display unit, the coordinates being stored and transmitted in a form of an array, wherein the location information of the display region corresponding to the display unit comprises a location of the display region corresponding to the display unit relative to a terminal screen, a shape of the display region, a proportional relationship between a size of the display region and the screen size;

determine color display data of the display region; and send the color display data to the display assembly via a communication between the terminal and the display assembly established in advance, to make the display unit corresponding to the display region display a color corresponding to the color display data;

wherein the processor is configured to:

determine a color display mode of the display assembly; and determine the color display data of the display region based on a color display data processing mode corresponding to the color display mode;

wherein, the color display mode and the color display data processing mode have a mapping relationship and the color display data processing mode comprises a color processing mode where a color with a highest saturation in the display region as a color of the display region; or a color processing mode where a color with a largest range in the display region as a color of the display region.

8. The device as claimed in claim 7, wherein the processor is configured to:

obtain a parameter attribute of the display assembly, the parameter attribute at least comprising a number of display units and location information of each display unit on the terminal; and obtain display regions matching the number of display units by dividing in the target image based on the location information, each display region being adjacent to a location of a corresponding display unit mapped to the determined display region in the target image.

9. The device as claimed in claim 7, wherein the processor is configured to:

obtain a screenshot image comprising the current display frame of the terminal through a screenshot on the current display frame of the terminal.

10. The device as claimed in claim 9, wherein the processor is configured to:

determine a compression ratio of the screenshot image based on a screen resolution of the terminal;

compress the screenshot image based on the compression ratio to obtain a compressed screenshot image; and determine the display region in the compressed screenshot image.

11. The device as claimed in claim 7, wherein the processor is configured to:

delete the target image.

12. A non-transitory computer-readable storage medium having stored therein instructions that, when executed by a processor of a terminal externally provided with a display assembly, causes the terminal to perform a display control method, the method comprising:

obtaining a target image comprising a current display frame of the terminal;

determining a display region in the target image, the display region having a mapping relationship with a display unit comprised in the display assembly, wherein coordinates of boundary points of the display region relative to the target image of the current display frame of the terminal is obtained according to location information of the display region corresponding to the display unit and a screen size, the coordinates being configured to determine the display region corresponding to the display unit, the coordinates being stored and transmitted in a form of an array, wherein the location information of the display region corresponding to the display unit comprises a location of the display region corresponding to the display unit relative to a terminal screen, a shape of the display region, a proportional relationship between a size of the display region and the screen size;

determining color display data of the display region; and sending the color display data to the display assembly via a communication between the terminal and the display assembly established in advance, to make the display unit corresponding to the display region display a color corresponding to the color display data;

wherein determining the color display data of the display region comprises:

determining a color display mode of the display assembly; and determining the color display data of the display region based on a color display data processing mode corresponding to the color display mode;

wherein, the color display mode and the color display data processing mode have a mapping relationship and the color display data processing mode comprises a color processing mode where a color with a highest saturation in the display region as a color of the display region; or a color processing mode where a color with a largest range in the display region as a color of the display region.

13. The non-transitory computer-readable storage medium as claimed in claim 12, wherein determining the display region in the target image comprises:

obtaining a parameter attribute of the display assembly, the parameter attribute at least comprising a number of display units and location information of each display unit on the terminal; and obtaining display regions matching the number of display units by dividing in the target image based on the location information, each display region being adjacent to a location of a corresponding display unit mapped to the determined display region in the target image.

14. The non-transitory computer-readable storage medium as claimed in claim 12, wherein obtaining the target image comprising the current display frame of the terminal comprises:

obtaining a screenshot image comprising the current display frame of the terminal through a screenshot on the current display frame of the terminal.

15. The non-transitory computer-readable storage medium as claimed in claim 14, wherein determining the display region in the target image comprises:

determining a compression ratio of the screenshot image based on a screen resolution of the terminal;

compressing the screenshot image based on the compression ratio to obtain a compressed screenshot image; and determining the display region in the compressed screenshot image.

16. The non-transitory computer-readable storage medium as claimed in claim 12, wherein the method further comprises: deleting the target image.

* * * * *